United States Patent
Rudaitis et al.

[11] Patent Number: 5,153,409
[45] Date of Patent: Oct. 6, 1992

[54] QUICK RELEASE TEACH TOOL

[75] Inventors: Erick W. Rudaitis, Warren; Glenn M. Krcek, Sterling Heights, both of Mich.

[73] Assignee: General Motors Corporation, Detroit, Mich.

[21] Appl. No.: 650,831

[22] Filed: Feb. 1, 1991

[51] Int. Cl.⁵ ............................................. B23K 26/02
[52] U.S. Cl. ........................ 219/121.83; 219/121.63; 219/121.67; 219/121.84; 364/474.08
[58] Field of Search .................... 219/121.83, 121.84, 219/121.63, 121.64, 121.67, 121.72; 364/474.08

[56] References Cited

U.S. PATENT DOCUMENTS

| | | | |
|---|---|---|---|
| 4,700,045 | 10/1987 | Merry et al. | 219/121.78 |
| 4,831,316 | 5/1989 | Ishiguro et al. | 318/568.13 |
| 4,924,063 | 5/1990 | Büchel et al. | 219/121.64 |
| 5,001,324 | 3/1991 | Aiello et al. | 219/121.63 |
| 5,067,086 | 11/1991 | Yamazaki et al. | 364/474.08 |

Primary Examiner—C. L. Albritton
Attorney, Agent, or Firm—Ernest E. Helms

[57] ABSTRACT

A teaching tool for programming a laser beam using a robot is provided. The teaching tool includes a sensor which emits a low energy laser beam to be focused on to a predetermined point on a masterwork piece, a photoelectric array associated with the sensor for receiving energization from the laser beam, a housing, a source of focused incandescent light so that a programmer can visually observe the point at which the laser beam is focused, a control and comparator circuit receiving signals from the photoelectric array to determined the focal length of the laser beam emitted by the sensor and a diode gate for effecting energization of a signal indicating that the low energy laser beam of said robot will effect optimize work on said workpieces.

19 Claims, 6 Drawing Sheets

QUICK RELEASE TEACH TOOL

TECHNICAL FIELD

This invention relates to laser beam working unit such as a laser beam welder and cutters, and more particularly to a new and improved teach tool and method for programming a robot for optimizing the movements of a robot and associated laser beam through a course in which laser beam work points and work areas on a master work piece are programmed with optimized precision so that subsequent work pieces are laser beam worked with optimized precision.

BACKGROUND OF THE INVENTION

Prior to the present invention, teach tools such as mechanical contacts have been installed on the manipulative head of a robot, and the head has been moved by a programmer across master work pieces. By observing the teach tool and the physical contact thereof with master work pieces, a program was developed for teaching robots to follow a certain course and to execute laser work such as cutting or welding. The prior teach tools usually employ a telescopic plunger with an observable optimized work or indicator line such as a ring painted on the plunger so that a programmer can move the robot to selected stations to observe the work line while the plunger physically engages the point to be welded so that the work or weld points can be programmed to appropriately control the weld. If there is to be a linear or curved weld, the programmer will move the plunger from a starting point across the intended weld line until the terminal point is reached. The weld indicator line of the plunger will be observed during this time by the programmer to insure that the beam will be appropriately focused on the points to be welded. While these prior teach tool have allowed for improved laser weld for many components, difficulties have been encountered in precisely programming a welder to provide optimize welds. Most of these difficulties occur because the programmer is unable to precisely observe the work indicator line, position of the plunger and its exact point of physical or tip contact in teaching the laser unit to work at optimized points.

Furthermore, it was necessary to dismantle parts of the robot, such as the air knife, prior to attachment of the teaching plunger. The prior teach tool was particularly difficult to use in programming the laser unit where work parts are clamped together and the laser work had to be executed in openings within the clamps and other adjacent areas which are extremely difficult to observe. Additional difficulty arose when the welder had to be taught to weld work pieces having complex curvatures and surfaces to be welded. Generally, this involved averaging observed contact points along the curved workpieces to generally obtain an acceptable weld. Some of such welds were subsequently rejected and rework was required.

The present invention overcomes the difficulty of the prior art teach tool by providing a noncontact teaching tool and method incorporating a focused light visible pointer in which the programmer can readily observe and program at selected work points. The focused visible light simulates the position of the laser beam and allows the programmer to view darkened areas that are often encountered in areas such as in or near workpiece clamps and other obstructions. Additionally, the present invention allows the programmer to be assured that the light beam accurately simulates the laser beam by the inclusion of displacement sensor that incorporates a small battery powered laser within the teach tool. The laser beam generated by the sensor, invisible to the human eye, is mounted to a teaching pendant attached to the air knife whose height and position are determined by comparator circuitry and visible indicator lights so that the programmer knows by visible observation of the indicator lights whether the laser is positioned by the robot at a proper focal length for the optimized laser working of a plurality of substantially identical work pieces.

It is a feature, object and advantage of this invention to provide a new and improved noncontact teach tool and teaching method for programming a robot so that a laser beam work device carried by the robot using the program performs work with optimized precision on a series of work pieces as taught by the teach tool.

It is a feature, object and advantage of this invention to provide a new and improved teach tool and method for programming a robot so that a programmer can determine with optimized precision the points at which laser beam work is to be performed on a master workpiece and to develop a program that can be used to effect laser beam work on a series of workpieces which are like the master workpiece.

Another feature, object and advantage of this invention is to provide a new and improved portable teach tool for teaching a robot to follow a predetermined path and execute laser beam work at predetermined points or lines which incorporates a pendant type housing attached to the manipulative head of a robot in which there is a visible light pointer that can be energized and focused at a point that simulates the point at which the working laser beam is to be focused so that the programmer can program the work points for the robot and further in which there is a battery powered laser used to produce a displacement measuring laser beam that coincides with the visible light point to measure and to optimize programmer the determination of the precise points at which the working laser is to be focused.

A feature, object and advantage is to provide an new and improved noncontact teaching tool for a laser beam robot welder to make repetitive welds of a plurality of work pieces in an optimized fashion to improve welds and welder efficiency.

Another feature, object and advantage of this invention is to provide a pendant type teach tool for a robotic laser beam welder in which a focused incandescent lamp is employed to indicate the weld points of a focused laser beam.

Another feature, object and advantage of this invention is to provide a new and improved quick change gas tube for an air knife assembly of a robotic laser beam device so inert gas can be delivered to the working point of the laser beam.

These and other features, objects and advantages of this invention will become more apparent from the following detailed description and drawings in which:

DETAILED DESCRIPTION OF THE DRAWINGS

Figure 1:
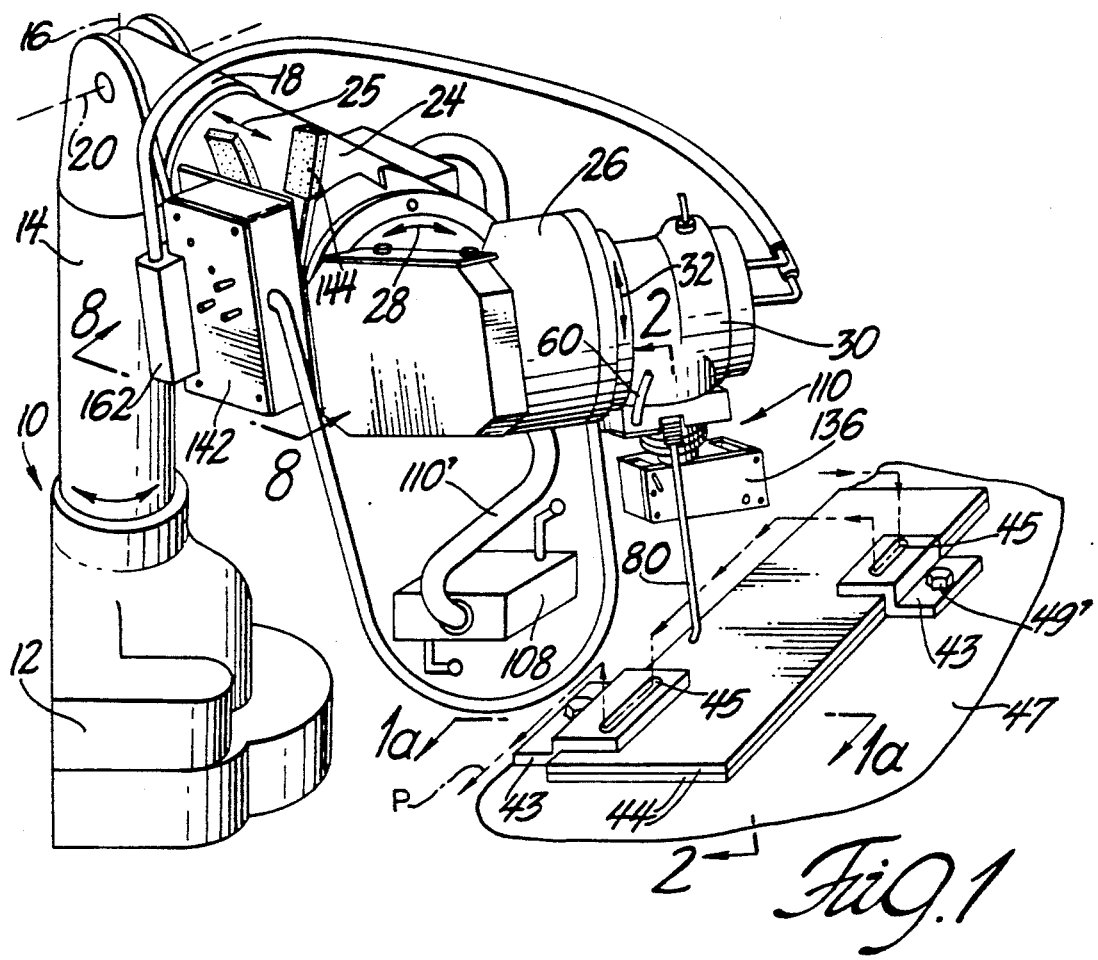
FIG. 1 is a pictorial view of a robot with a laser beam welder and with the teach tool of the present invention attached thereto for teaching the welder to laser beam weld workpieces clamped together.

Turning now in greater detail to the drawings, there is pictorially shown in FIG. 1 a multi axis robot 10 which is employed for laser beam welding, cutting or other laser beam work that has a mounting base 12 and an upright 14 mounted on the base for rotation about vertical axis 16. A radial arm 18 is mounted on upright 14 for turning movement with respect to pivot axis 20. The radial arm 18 supports an extension arm 24 which can telescopically move with respect thereto, as shown by arrows 25. Extension arm 24 carries at its end an angular housing 26 that can turn about the center axis of the extension arm as indicated by arrow 28. Rotatably secured to the end of the outboard end of the angular housing is a head 30 that can turn about the axis of the housing 26, as indicated by arrow 32.

Figures 1A, 2:
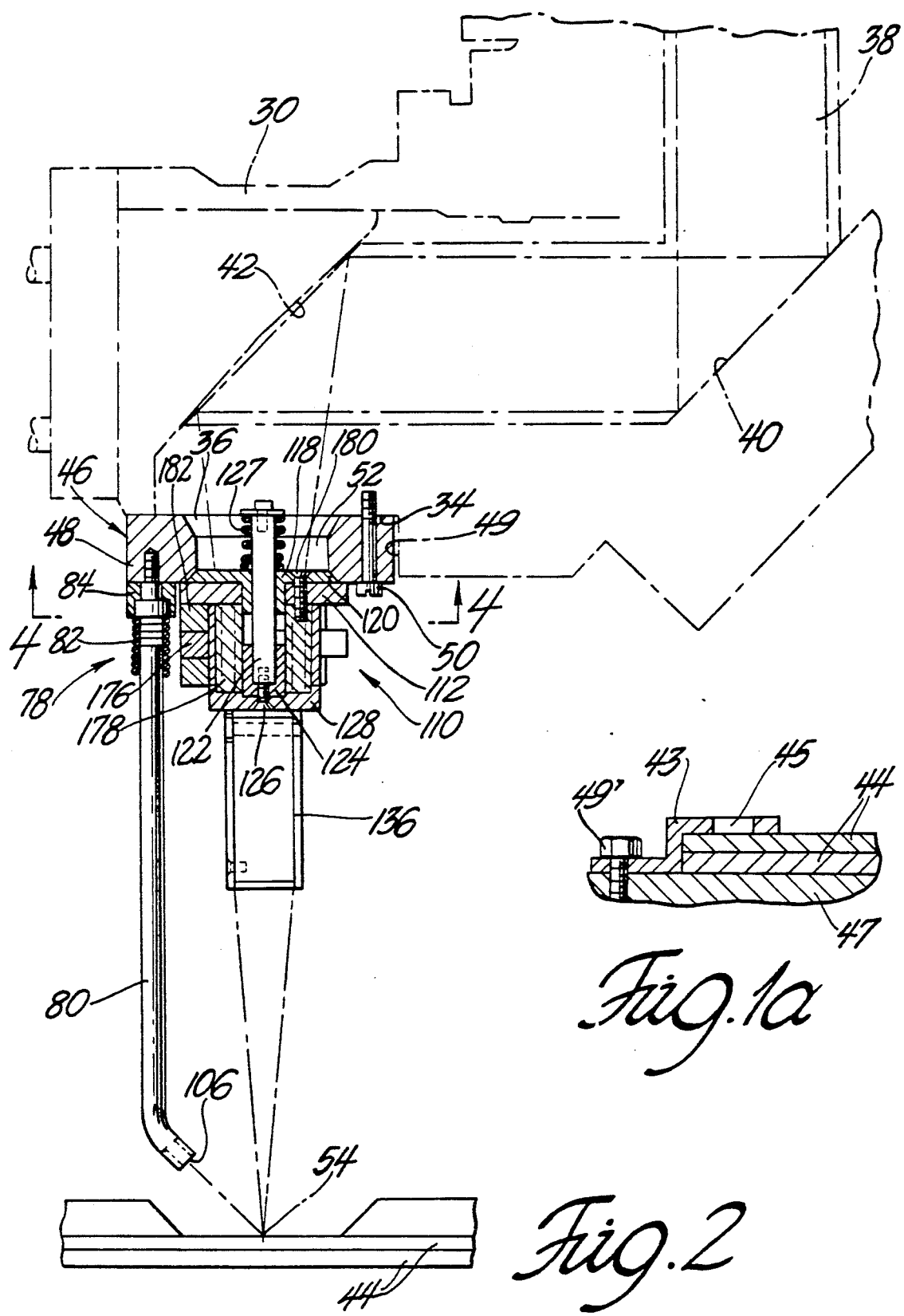
FIG. 1a is a cross-sectional view taken generally along sight lines 1a—1a of FIG. 2.
FIG. 2 is a view taken generally along sight line 2—2 of FIG. 1 with the tube of the welder partly shown in an area to be welded.

The head 30 diagrammatically shown in phantom lines in FIG. 2 has a flat lower surface 34 with an opening 36 therethrough for a working laser beam 38 which is reflected by surface 40 within the head onto a concave focusing surface 42. In the absence of the teach tool of this invention, the reflecting surface 40 is capable of focusing the laser beam onto work pieces 44 when the laser is energized for welding or other laser working operation. The workpieces are secured in position by clamps 43 having openings 45 therein secured to a base 47 by threaded fasteners 49'.

An air knife assembly 46 which includes a box like housing 48 is adjustably fixed to the head 30 of the robot and against the annular shoulder 49 thereof by threaded fastener means 50. The air knife housing has a central opening 52 through which in a laser welding operation the directed laser beam extends as a focused point 54 onto the workpieces 44. Pressure air is supplied to the air knife assembly from a suitable pressure supply source 58 through hose 60 that terminates in a fitting 62 which can be threaded into an opening 64 in one side of the air knife housing. This pressure air is directed by passage 66 in the air knife housing to an arcuate array of openings 67 that are generally radial with respect to the peripheral edge of the air knife housing that defines the central opening 52. With high pressure air directed transversely across the opening, a pneumatic force is provided which will block the central opening so that foreign matter is excluded from entry into the head of the robot to prevent contamination of the focusing mirror 42 or other components therein.

Figure 4:
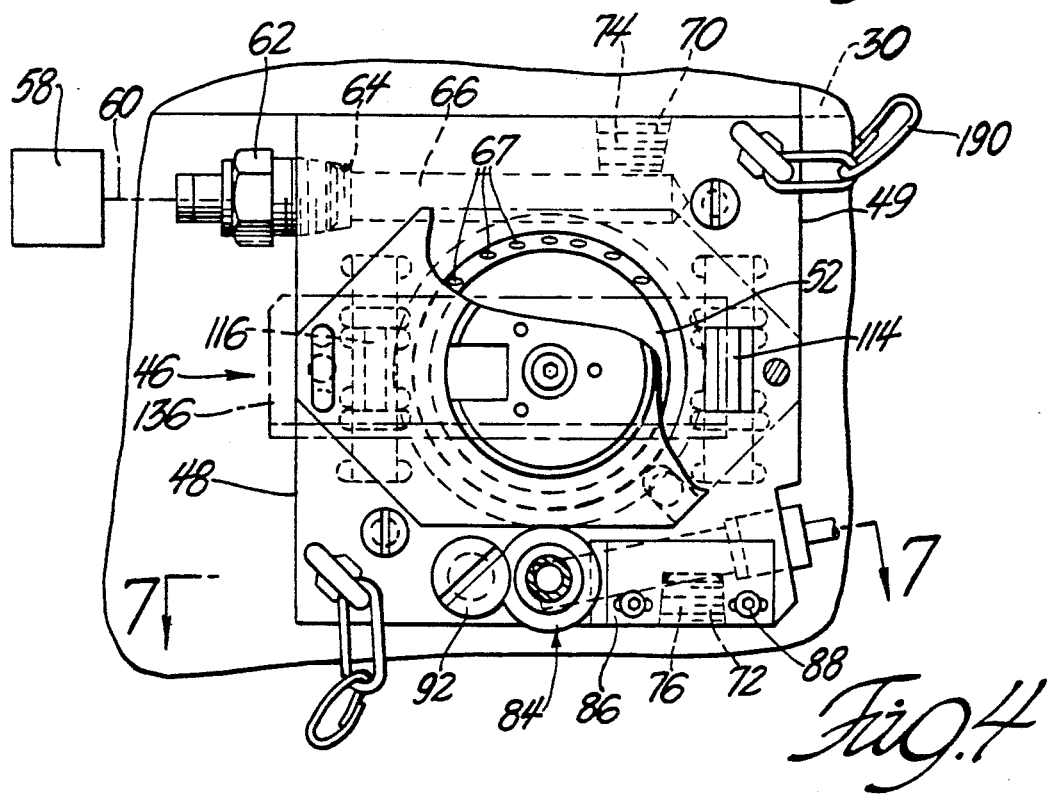
FIG. 4 is a view taken generally along sight lines 4—4 of FIG. 2.

In addition to the air hose opening 64, the air knife assembly 46 is formed with optional side openings 70, 72 on adjacent sides of the air knife housing, as shown in FIG. 4, which are blocked by plugs 74, 76. These side openings can be unplugged and electively employed, if needed, to receive the air hose and fitting when orientation of the quadrant of the air knife assembly is changed. It is desirable at times to change air knife orientation to thereby change the position of the discharge end of the gas feed tube assembly 78 described below so that it leads, trails or is positioned to the left or right of the weld to optimize weld strength and performance.

Figure 7:
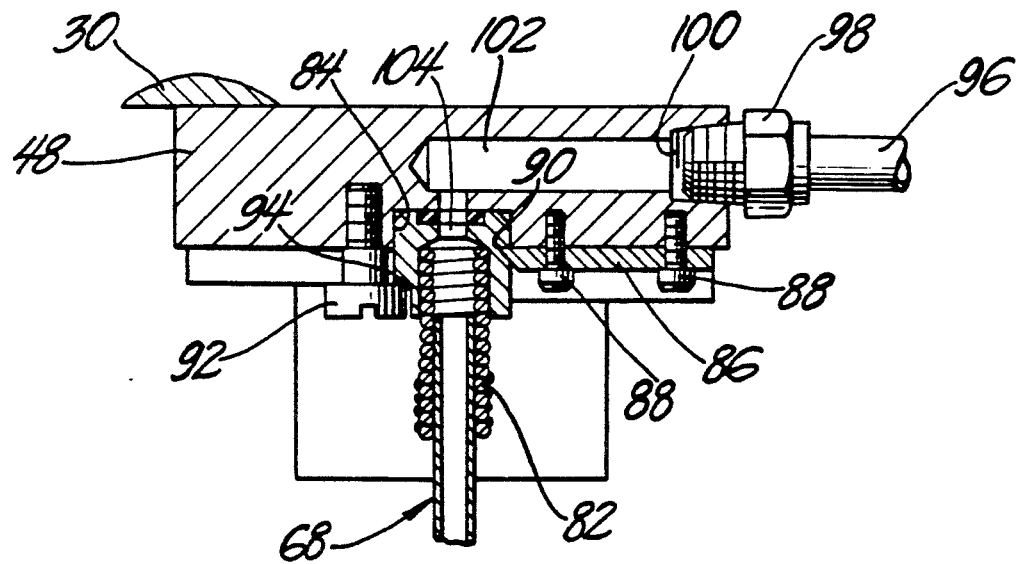
FIG. 7 is a cross sectional view taken generally along sight lines 7—7 of FIG. 4.
Figure 8:
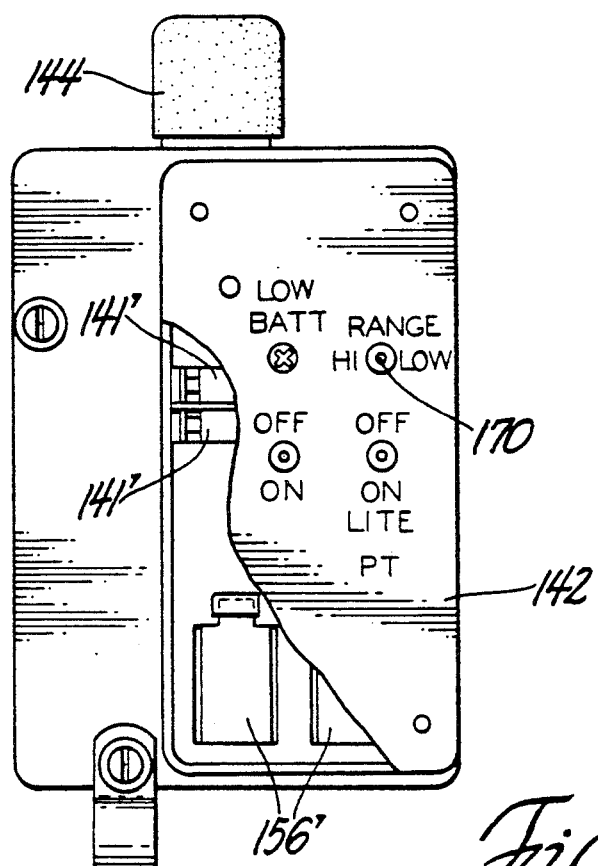
FIG. 8 is a front elevational view with parts broken away of the power pack and clamp of this invention.
Figure 9:
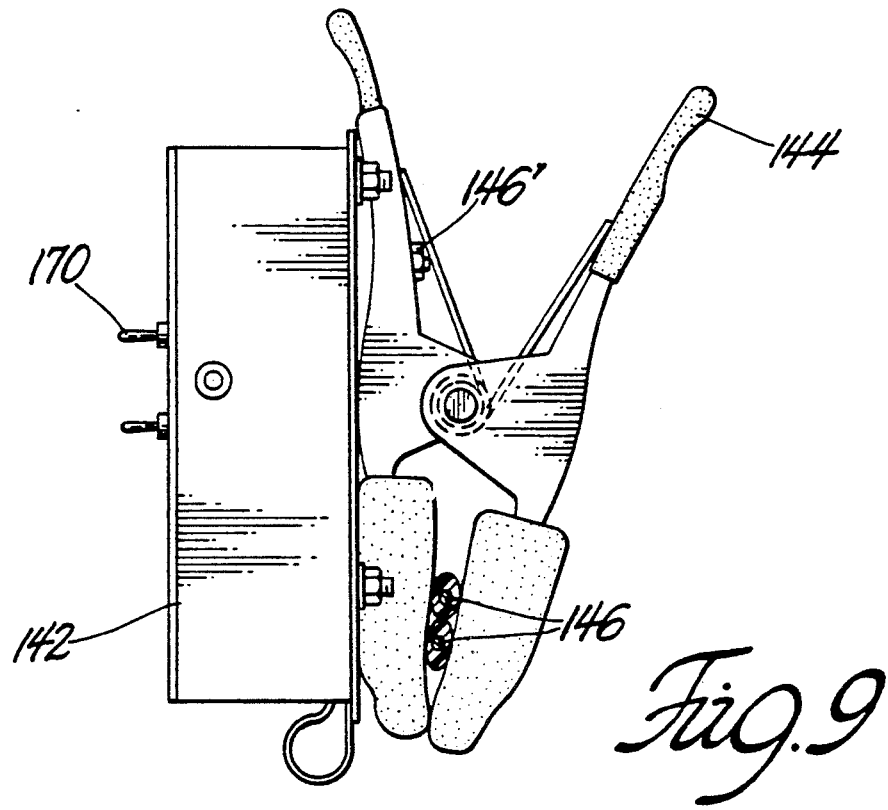
FIG. 9 is a side elevational view of the power pack and clamp of FIG. 8.
Figure 10:
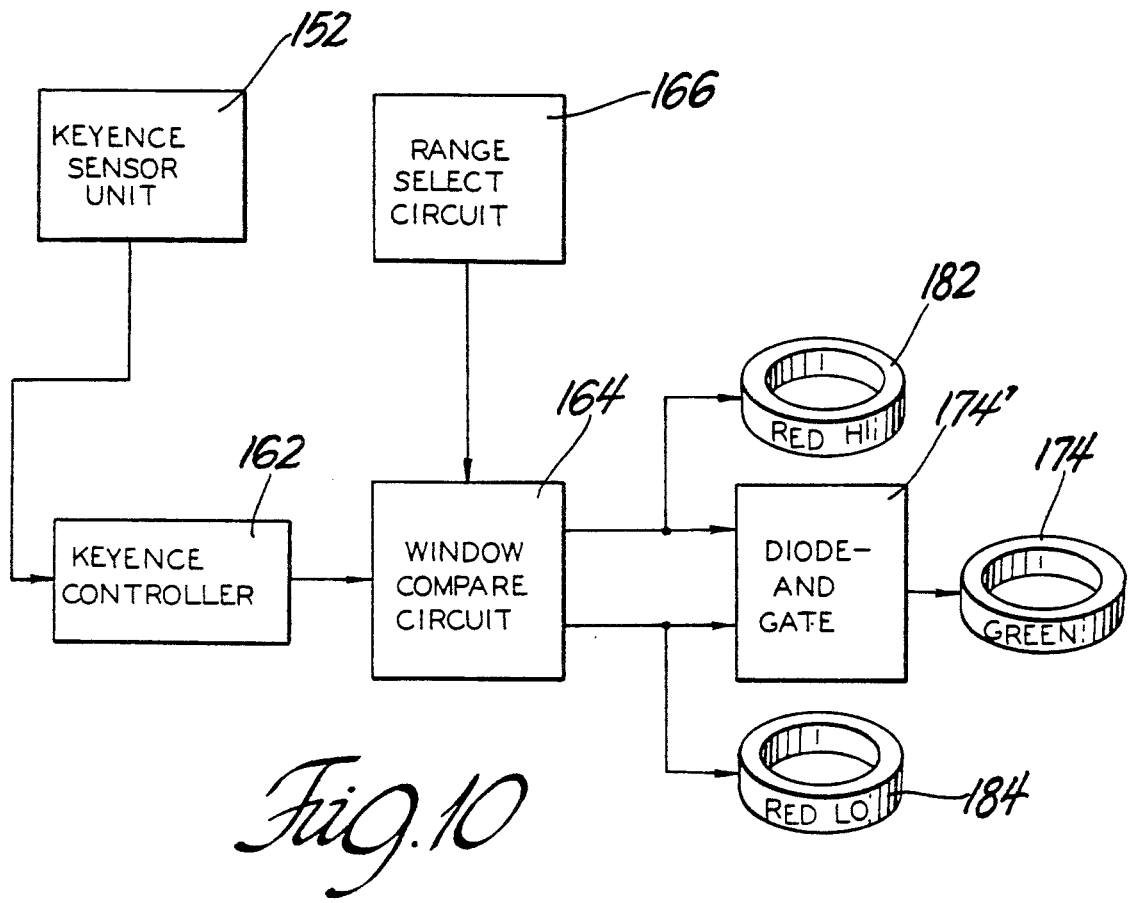
FIG. 10 is a diagram of circuitry for the teach tool of this invention.
Figure 11:
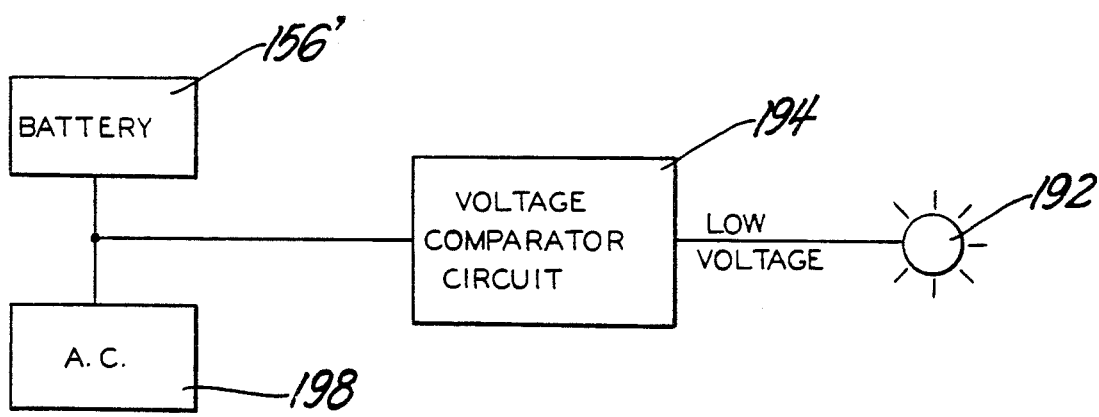
FIG. 11 is a diagram of voltage test circuitry housed within the power pack of this invention.

The air knife assembly 46 has a quick release gas assist tube assembly 78 removable attached to the housing 48 thereof. This assembly includes an elongated gas feed tube 80, the upper end of which is soldered to some of the lower turns of a helical connector spring 82. The upper turns of this spring connector 82 are soldered to a block like holder 84 which is removably secured in place by a knife edged retainer plate 86, FIG. 7, secured to the air knife housing 48 by screws 88. The knife edge 90 of plate 86 closely fits into a companion slot in the holder 84. In addition to the knife edge retainer, the holder is secured to the housing of the air knife assembly by threaded fasteners 92, which threads into the air knife housing 48 and which has an enlarged cylindrical head that abuts the retainer shoulder 94 to secure the gas assist tube assembly 68 to the air knife housing.

With this construction, the air knife assembly can be readily removed if broken or damaged and replaced by a new air knife assembly using only simple tools to unfasten and fasten the screws 88 and 92. The gas assist tube is supplied with helium or other suitable inert gas from a source, not illustrated, connected by a hose 96 and fitting 98 to an inlet 100. Gas is fed through passage 102 to right angular opening 104 formed in the holder 84 to the gas tube assembly 78. While the connector spring 82 is welded to the holder 84 and to the upper end of the gas tube 80, some of the coils are free between these two weld areas. This give the spring the ability to yield, as provided by the free spring coils between the gas assist tube and its retainer. This flexure point reduces breakage in the event that the discharge end 106 or some other portion of the tube strikes a clamp or some other fixture. However, if there is tube breakage, the retainer plate 86 and screws 88 and 92 permit the ready installation of a new gas tube for one that is damaged of broken.

In any event, low pressure inert gas is directed by the discharge end of the tube to prevent oxidation or contamination of the weld or work point 54 during laser working operation. The air knife assembly is retained in place during teaching or programming of the robot since the assembly must clear all obstacles and be appropriately positioned during actual laser working operation.

The working laser beam is supplied to the robot from a conventional laser generator 108 that has an output provided by a transmission tube 110 operatively connected to a laser input of the robot. From this input, the laser travels as the linear beam 38, FIG. 2, onto surface 40 and is reflected at right angles from surface 40 onto the focusing mirror 42. Assuming that only the air knife is in place in FIG. 2, the laser beam would be directed through the opening in the air knife onto the work pieces where they would be welded together or otherwise cut or worked with assist from the nitrogen supplied through the gas tube 80 preventing oxidation of the welds. As previously pointed out, the air knife assembly that is attached to the head of the robot welding directs a stream of pressure air across the opening to prevent splatter or other foreign matter from entering into the head assembly, such as may occur during a laser welding operation.

However, the present invention is directed to the teaching of a program for the robot to follow a predetermined path diagrammatically shown as path P in FIG. 1 to effect an optimized laser weld or other laser beam work for a series of identical workpieces in quantity production. To this end, the preferred embodiment of this invention has a teach tool pendant assembly 110 that comprises a flat cover plate 112 that is releasably mounted to the bottom surface of the air knife housing 48 by magnets 114 and 116. These magnets hold the teach pendant assembly to the air knife housing with a predetermined force, five pounds for example, to provide a release in the event that the teach tool pendent assembly, or other component of the teach tool, encounters braces or clamps when the robot is being taught, to prevent damage to the teach tool pendant assembly. The cover plate 112 has a pilot member secured thereto that includes a tapered annular head 118 that rotatably fits within the annular tapered opening 120 in the air knife housing. A rotatable cylindrical support 122 that extends through the tapered head 118 and its shank to a cup like connector 124 secured to the lower end thereof by a threaded fastener 126. The threaded fastener 126 also attaches a rotatable carrier plate 128 to the connector cup 124. Cylindrical support 122 has a spring 127 mounted at the upper end thereof. This spring 127 in conjunction with three arcuately spaced magnets 178 hold carrier plate 128 and sensor housing 136 in any rotatably adjusted position.

Figures 3, 3A:
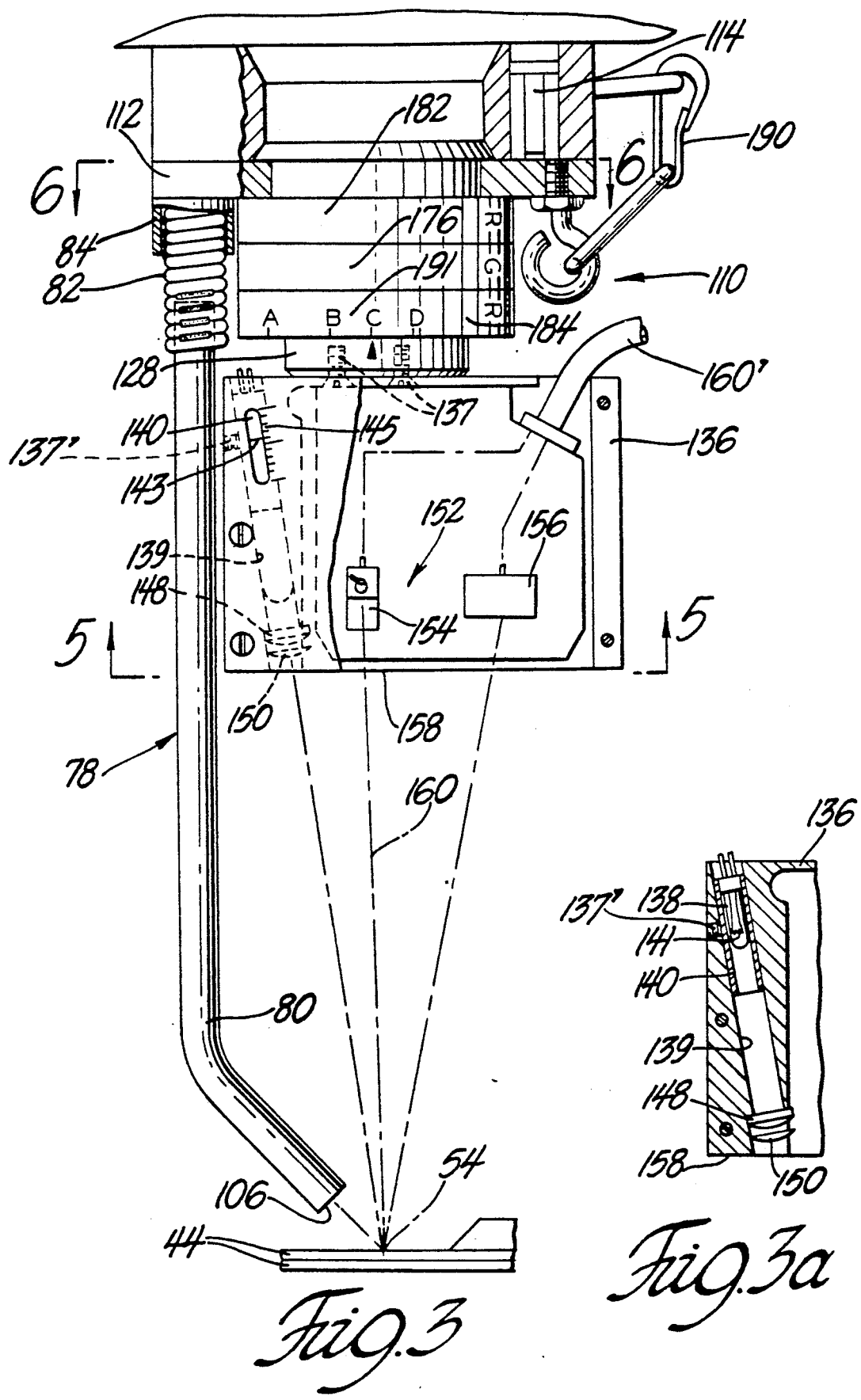
FIG. 3 is a view similar to FIG. 2 showing details of lower components thereof in an adjusted position.
FIG. 3a is a cross sectional view of the adjustable lamp carrier of FIG. 3.
Figure 5:
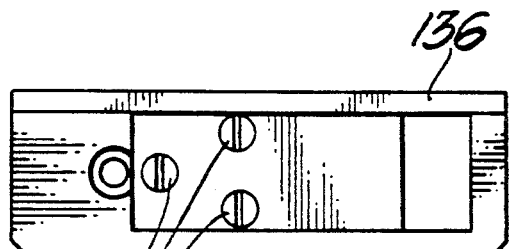
FIG. 5 is an end view of the teach tool taken generally along sight lines 5—5 of FIG. 3.
Figure 6:
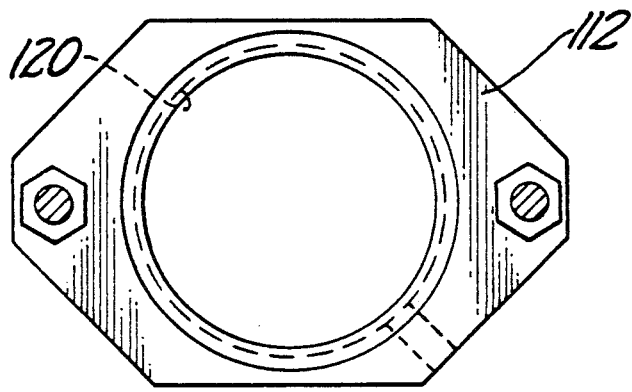
FIG. 6 is an end view taken generally along sight lines 6—6 of FIG. 3.

As shown best in FIG. 3, the pendant assembly 110 includes the box-like sensor housing 136 secured to rotatable carrier plate 128 by threaded fasteners 137 in which an incandescent filament lamp 138 supported by carrier 140 is adjustably mounted within an elongated opening 139 therein. A conventional set screw 137' threaded in the side of housing 136 can be threadedly advanced against the lamp carrier to hold the lamp and its carrier in an adjusted position. Index 143 on the face of the carrier is aligned with lamp filament and is visible through the slot in the cover plate of the housing. The index 143 is used with scale 145 so that once a lamp has been adjusted to a position where it has optimized focus on point 54, precision replacement by a new lamp is facilitated in the event of original lamp burn out. This eliminates refocusing problems that may otherwise occur. This lamp 138 is energized by a conventional battery 141' mounted within a portable power box 142 which is secured by manually operable clamp 144 to cables 146 or other components of robot 10. The clamp 144 is secured to the back plate of the power box by threaded fasteners 146'.

The output of this lamp is focused by a lens 148 with infrared rays filtered out by filter 150 onto the work pieces at point 54 as shown in the FIG. 3. More particularly, this light pointer is focused at the smallest point, i.e., point 54, observable by the programmer and it simulates the point where the laser welder will direct its working laser beam in welding, cutting or otherwise working on the parts in mass production. The programmer will record this point as weld or laser work point on the program.

To insure that the incandescent lamp provides the proper focal point for record, the work point laser welder, a Keyence sensor 152 (FIG. 3) having a battery powered diode laser 154 is mounted within the housing 136. The sensor is powered by battery 156' in the power box 142. The position of the power box can be readily changed by use of the associated hand clamp to remove the power box or change location so that the portability of the Teach Tool is enhanced. The housing 136 has an opening 158 in the lower end thereof which allows the diode laser beam 160 to impinge on the incandescent lamp focal point 54. The laser beam reflecting from point 54 enters the housing 136 onto a photoelectric array 156 of the Keyence sensor which provides an output fed by cable 160' to a Keyence controller 162 that is mounted to the box 142. The Keyence controller 162 has conventional circuitry which provides an output analog voltage which is fed to a conventional window comparator 164 circuit mounted on board housed with the power package 142. The comparator circuit is controlled by a conventional range selector circuit board 166. If a wide focal range is selected by moving range switch 170 to the high position, the window or range comparator circuit 164 will supply a voltage to the diode-and gate 174' if the robot head is positioned at a station in which the working laser beam effectively focuses within the wide range. If the distance as precisely measured by the battery powered Keyence sensor within the allowable range, the diode-and gate 174 effects energization of a green light ring 176 which is disposed around the center mount 178 secured by screw 180 to the tapered head of the pilot 118 and below cover plate 112. If the range is too high, the red lighted, high ring 182 is energized so that the programmer will visually know that the focus point of the working laser is above the workpieces and the head of the robot must be lowered for effecting an optimized laser beam weld. At this time, the visible light is refocused. If a narrow focal range is selected by moving switch 170 to a low range position, the comparator circuit will again determine if the proper position has been obtained for optimized focus of the working laser. If the diode-and gate effects energization of the green light ring, the programmer will visually know that the robot head is properly positioned and the point can be added to the program. If the red high or low rings 182 or 184 respectively are energized, the robot head must be repositioned until the green lighted ring is again energized. Accordingly, this invention provides green light visibility of about 270° which precisely assures the programmer that the visible light point accurately depicts the weld or work points for the working laser beam. Accordingly, the programmer can from many positions without eye strain displace the head of the robot until the green light is energizable and this point will be programmed so that the laser beam will be appropriately positioned for effecting an optimized weld in production operation. The programmer will then move the laser beam teach tool to a second point, such as shown in FIG. 1, which could be at the end of the slot within the retainer bracket. The incandescent lamp and battery powered diode laser will then be again energized to determine whether or not the laser beam from the laser welder will be optimized for subsequent laser beam welding of similar parts and mass production operation. When the green light is observable by the programmer, this point is recorded into the program and the robot is moved to a different point at which the process is repeated so that a program is produced allowing the welder to make optimized laser beam welds or other on mass produced parts.

In the event that the welder may strike an obstacle, such as a clamp, the pendant assembly 110 can possibly be knocked from its mounting to the air knife if the retention force of the magnets 114 and 116 are overcome. To prevent the housing from falling to the work surface and possibly damaging the Keyence sensor, linkage 190 between the mounting plate 112 and the knife plate 46 retains the pendant assembly attached to robot so it can be recoupled to magnets 114 and 116 by the programmer. Then the robot can be repositioned by the programmer who notes the place of contact and programs the robot so that the obstruction will not again be encountered. Appropriate indicia 191 is employed with the housing so the programmer can turn the housing to selected locations and program the turned position to avoid obstacles.

In the event that the battery has insufficient power, a low battery light 192 is energized by the voltage comparator circuit 194 on a board mounted within the power pack 142. This visually signals the requirement for a new battery 140. If an A.C. supply 198 is used for energizing the diode laser circuit, the low voltage comparator circuit will again indicate if the A.C. voltage is adequate.

While the above description constitutes preferred embodiments and method of the invention, it will be appreciated that the invention can be modified and varied without departing from the scope and fair meaning of the accompanying claims.

We claim:

1. A teaching unit for programming a laser beam support unit to effect laser beam work on workpieces at predetermined weld locations comprising a sensor housing unit, an incandescent lamp, means in said sensor housing for holding said lamp at a predetermined location, energizing means for energizing said lamp to produce visible light energy, means for focusing said light energy to a predetermined focal point, attachment means for securing said sensor housing unit to said support unit, means for emitting a lower energy laser beam from said sensor housing unit onto said workpieces, means for sensing the focal length of said low energy laser beam, comparator circuit means to determine the focal length of said low energy laser beam and indicator means to indicate if said laser beam support unit is positioned at a location to effect optimized laser beam work.

2. A teaching tool for programming a robot with laser beam means associated therewith to perform work on a series or workpieces, said teaching tool comprising a sensor means affixed to the head portion of said robot to emit a low energy laser beam to be focused on to a predetermined point on a masterwork piece, a photoelectric array means associated with said sensor means for receiving energization from said low energy laser beam, housing means for said sensor means, a source of incandescent light affixed to the head portion of said robot, focusing means for focusing the light rays of said incandescent light source on to said masterwork piece so that a programmer can visually observe the point at which the laser beam is focused, control and comparator circuit means receiving signals from aid photoelectric array means to determine the focal length of said energy laser beam emitted by said sensor and a diode and gate means or effecting energization of signal mean indicating that the laser beam means of said robot twill effect optimize work on said workpieces.

3. A teaching tool for a laser beam welding device which is operatively mounted to an articulated machine comprising an air knife assembly attached to he head of the machine, a cover plate affixed to the air knife assembly, an elongated mounting ring suspended from said cover plate, a at least first and second light rings extending around a portion of aid teaching tool, a sensor assembly affixed to a carrier plate which is in turn affixed with the cover plate, and electrical control means for energizing said first light ring if the head o the welder is within a predetermined range, and said electric control means energizing said second ring means in the event that the head of said welder is outside of he range of optimized weld.

4. A laser displacement sensor comprising in combination a housing, sensor head means having a laser beam emitting portion and associated lens means operatively mounted in said housing for directing a laser beam to an object to be detected by said laser displacement sensor, said sensor head means further having a photoelectric array means for receiving laser beams reflecting from the object to be detected, controller means calibrated with said sensor for receiving input from said photoelectric array means, incandescent lamp means operatively mounted with respect to said housing and energizable to provide a source of light visible to the human eye operatively mounted on said housing means, means for focusing said visible at a point on said object to be detected which substantially coincides with the laser beam as focused on the object to be detected, power source means to provide energy to said sensor head means and to said incandescent lamp means so that a human observer can determine the point at which said laser beam is focused on said object to be detected by observing the focused visible light.

5. The laser displacement sensor of claim 4, wherein said source of visible light is a filament lamp mean, means mounting said filament lamp means in said housing so that said filament lamp means is adjustable in said housing so that said filament will appear as focused visible light on said object to be selected, and indicia means associated with said housing to indicate the position of said filament so that a replacement lamp can be precisely located at said point at which said original lamp has been located 6. The laser displacement sensor of claim 4, in which said housing surrounds said sensor to block the entrance of external light to be directed onto the lenses of said sensor, and wherein said housing protects said sensor from damage from a force directed toward said sensor external of said housing.

7. An air knife assembly for adjustable attachment to the head portion of a machine having a source of laser beam energy adapted to be focused on work to be performed by said laser beam, an elongated gas charge tube means to be attached to said air knife assembly for discharging a gas in an area adjacent to the beam focused on said workpiece, attachment means for adjustably fixing said air knife to said head portion in a first position whereby said gas tube is at one quadrant of said focused laser beam and for subsequently fixing said air knife to said head at a second position so that said tube is at another quadrant of said focused laser beam and for subsequently fixing said air knife into said head portion at a third position whereby said gas tube lead is at a third quadrant of said focused laser beam.

8. A quick change gas nozzle assembly for a laser beam working unit on a machine having a head that can be manipulated to a plurality of varying working positions comprising a housing adapted to be installed on said machine having a gas inlet therein for connection to a source of pressurized gas, a passage in said housing for receiving gas from said inlet and having an outlet passage, said gas nozzle assembly comprising a gas transmitting tube having an upper inlet end and a lower outlet end and for directing a stream of gas to the output focal point of a laser beam working unit, helical spring means having a plurality of coils closely adjacent to one another, a holder for said coils affixed to a number of said coils of said helical spring means, a number of said coils of said spring means being fixed to said tube, a number of said coils between said fixed coils which are free to flex, and release means for releasable securing said holder in position in said housing so that said gas nozzle can be removed from said housing and replaced in the event that said gas nozzle becomes damaged or broken.

9. The gas nozzle assembly defined in claim 8 above, in which said holder is secured in position by threaded fastener means which contacts a portion of said housing and threads into said holder means.

10. A quick change gas nozzle assembly for a laser beam working unit for installation on a machine having a head that can be manipulated to a plurality of varying positions comprising a housing adapted to be installed on said machine having a gas inlet therein for connection to a source of pressurized gas, a passage in said head for receiving gas from said inlet and having an outlet passage, a gas nozzle assembly comprising a gas transmitting tube having upper and lower ends, helical spring means affixed to an number of coils of said upper end of said gas transmitting tube, a holder for said coils affixed to a number of upper end coils of said helical spring means, a number of coils between said upper and lower end coils which are free to flex, and release means for releasably securing said holder in position in said housing so that said gas nozzle can be removed from said housing and replaced in the event that said gas nozzle becomes damaged or broken.

11. The gas nozzle assembly defined in claim 10 above, in which said holder is secured in position by threaded fastener means which contacts a portion of said housing and screws into said housing means.

12. The gas nozzle assembly defined in claim 11, and including a knife plate which has a knife edge which mount in a slot in said holder and retains said holder in position in said housing, and threaded fastener means securing said plate to said housing.

13. A method of programming a robot and a laser welder associated therewith to laser well work pieces together at optimize weld depth along a predetermined path in which the robot travels adjacent to the workpieces that may vary in depth and profile comprising the steps of:
   (1) mounting master workpieces in predetermined positions on a support,
   (2) attaching a teach tool to a manipulative head of the robot at a predetermined point thereon;
   (3) energizing a source of incandescent light carried by the teach tool,
   (4) focusing said energized light to a point on said master workpieces,
   (5) aiming a laser beam on said point on said master workpieces,
   (6) measuring the distance of said laser beam from said source to said point on said master workpiece,
   (7) determining by observation of indicator means if said laser welder is sufficiently positioned and orientated to effect an optimized laser weld,
   (8) recording said position of said physically observed point of light emitted by the said source of incandescent light.

14. A method of programming a robot laser welder to weld work pieces positioned at predetermined relative position by fixture means and in whicn the weld is in a varying path comprising the steps of attaching a teach tool to the laser welder at a predetermined point thereon, energizing a source of incandescent light said energized light to a point at a first station to be subsequently welded by the robot welder so that a programmer can physically observe the point of light emitted by the said source, simultaneously energizing a laser beam so that it substantially coincides with the physically observable point of light, determining the distance that the welder is above the point to be welded, adjusting the welder so that the welder will effect an optimize laser weld at said selected point, moving said laser welder to a second station different from said first station, energize said source of incandescent light and focusing said light to a point by moving said laser welder to initially determine the location of the laser sensor beam to effect an optimize laser weld of the work pieces together, emitting a low energy laser beam to said work pieces, using said beam to effect measurement of the height of said weld above said work pieces, adjusting the height as or the weld required to effect an optimize weld.

15. A method of programming a robotic laser beam working tool to laser work workpieces positioned at predetermined relative position by fixture means and in which the weld is in a varying path comprising the steps of attaching a teach tool to the laser beam working tool at a predetermined point thereon, energizing a source of incandescent light and focusing said energized light to a point at a first station to be subsequently laser worked by the robot so that a programmer can physically observe the point of light emitted by the said source, energizing a laser beam so that it substantially coincides with the physically observable point of light, determining the distance that the working tool is above the point to be laser worked, adjusting the working tool so that the tool will effect optimized laser work at said selected point, moving said laser working tool to a second station different from said first station, energize said source of incandescent light and focusing said light to a point by moving said laser working tool to initially determine the height of that laser working tool should be to effect an optimize laser work of the work pieces, emitting a low energy laser beam to said work pieces, using said last mentioned beam to effect a measurement of the height of said laser beam working tool above said work pieces, adjusting the height as or the welder required to effect optimized laser work.

16. A laser displacement sensor comprising in combination a housing, sensor head means having a laser beam emitting portion and associated lens means operatively mounted in said housing for directing a laser beam to an object to be detected by said laser displacement sensor, said sensor head means further having a photoelectric array means for receiving laser beams reflecting from the object to be detected, controller means calibrated with said sensor for receiving input from said photoelectric array means, incandescent lamp means operatively mounted with respect said housing and energizable to provide a source of light visible to the human eye operatively mounted on said housing means, means for focusing said source of light at a point on said object to be detected which substantially coincides with the laser beam as focused on the object to be detected, power source means to provide energy to said sensor head means and to said incandescent lamp means so that a human observer can determine the point at which said laser beam is focused on said object to be detected by observing the focused visible light.

17. The laser displacement sensor of claim 16, wherein said source of visible light is a filament lamp means, means adjustably mounting said filament lamp means in said housing so that said filament lamp means will appear as focused visible light on said object to be welded, and indicia means associated with said housing to indicate the position of said filament so that a replacement lamp can be precisely located at said point at which said original lamp has been located.

18. The laser displacement sensor of claim 16 in which said housing surrounds said sensor to block the entrance of external light to be directed on the lenses of said sensor, and wherein said housing protects said sensor from damage from a force directed toward said sensor external of said housing.

19. An air knife assembly for attachment to the head portion of a machine having a source of laser beam energy adapted to be focused on work to be performed by said laser beam, an elongated gas charge tube means to be attached to said air knife assembly for discharging a gas in an area adjacent to the beam focused on aid workpiece, means or fixing said air knife to said head portion of said machine in a first position whereby said gas tube is at one quadrant of said focused laser beam and means rotatably adjusting said knife so that said gas tube can be moved to other position with respect said focused laser beam and means for adjusting said air knife assembly into said head potion of said machine whereby said tube leads said focused laser beam.

* * * * *